(12) United States Patent
Carralero et al.

(10) Patent No.: US 10,547,184 B2
(45) Date of Patent: Jan. 28, 2020

(54) SYSTEM AND METHOD FOR BATTERY MANAGEMENT

(71) Applicant: The Boeing Company, Chicago, IL (US)

(72) Inventors: Michael A. Carralero, Huntington Beach, CA (US); Jimmy M. Quiambao, Walnut, CA (US)

(73) Assignee: THE BOEING COMPANY, Chicago, IL (US)

( * ) Notice: Subject to any disclaimer, the term of this patent is extended or adjusted under 35 U.S.C. 154(b) by 80 days.

(21) Appl. No.: 14/624,754

(22) Filed: Feb. 18, 2015

(65) Prior Publication Data

US 2016/0241058 A1    Aug. 18, 2016

(51) Int. Cl.
*H02J 7/00* (2006.01)

(52) U.S. Cl.
CPC ............ *H02J 7/0029* (2013.01); *H02J 7/007* (2013.01); *H02J 7/0014* (2013.01); *H02J 7/0021* (2013.01); *H02J 7/0047* (2013.01); *H02J 2007/005* (2013.01)

(58) Field of Classification Search
CPC ...... H02J 7/0021; H02J 7/0016; H02J 7/0018; H02J 7/0019; H02J 7/0014; H02J 7/0029; H02J 7/007; H02J 50/12
USPC ................................................. 320/116, 137
See application file for complete search history.

(56) References Cited

U.S. PATENT DOCUMENTS

| 6,160,375 A | 12/2000 | Horie et al. | |
| 6,424,157 B1* | 7/2002 | Gollomp | G01R 31/006 320/132 |
| 6,498,454 B1* | 12/2002 | Pinlam | H01M 10/44 320/107 |
| 2004/0000913 A1* | 1/2004 | Raichle | H01M 10/4285 324/426 |
| 2005/0017686 A1* | 1/2005 | Sakakibara | H01M 10/44 320/132 |
| 2011/0248680 A1 | 10/2011 | Timmons et al. | |
| 2012/0169296 A1* | 7/2012 | Lukso | H01M 10/441 320/147 |
| 2013/0015821 A1* | 1/2013 | Kim | H02J 7/0019 320/128 |
| 2013/0026989 A1* | 1/2013 | Gibbs | H01M 10/441 320/116 |
| 2014/0042974 A1* | 2/2014 | Yang | H01M 10/441 320/119 |
| 2014/0159643 A1* | 6/2014 | Wagoner | H02J 7/0052 320/107 |
| 2014/0320088 A1* | 10/2014 | Nysen | H01M 10/052 320/150 |

(Continued)

FOREIGN PATENT DOCUMENTS

EP    1531536 A2    5/2005

*Primary Examiner* — Richard Isla
*Assistant Examiner* — Michael N Dibenedetto
(74) *Attorney, Agent, or Firm* — Patterson + Sheridan, LLP

(57) ABSTRACT

A system includes a battery and a power management unit connected with the battery. The power management unit controls power to the battery. A spare power unit can connect with the power management unit and the battery. The power management unit stores excess charge to the spare power unit and to divert stored charge to the battery when the battery is charged less than a determined percentage.

22 Claims, 9 Drawing Sheets

(56) References Cited

U.S. PATENT DOCUMENTS

| | | | |
|---|---|---|---|
| 2014/0354213 A1* | 12/2014 | Rivera-Poventud | H02J 7/0068 320/107 |
| 2015/0214757 A1* | 7/2015 | Zane | H02J 7/0021 320/107 |
| 2015/0323610 A1* | 11/2015 | Ahn | G01R 31/3675 320/152 |
| 2016/0093927 A1* | 3/2016 | Marcicki | H01M 10/0525 429/50 |

* cited by examiner

SYSTEM AND METHOD FOR BATTERY MANAGEMENT

FIELD

The systems and methods relate to managing operation of a battery and/or cells of a battery, for example to operate the lithium-ion battery within safe limits.

BACKGROUND

New battery technologies are beginning to breakthrough into aerospace and automobiles applications. The safety of these batteries can be complex and their failures can lead to overheating. To address these safety concerns, new improvements in battery chemistries with less reactive cathode materials, new thermally stable electrolyte solvents and improved separator coating materials can be implemented. Additional solutions like enclosures can be implemented to circumvent thermal runaway from causing fires to other system from the battery overheating. An enclosure adds weight, however, and does not solve the overheating problem.

SUMMARY

According to one aspect, systems and methods can control power to the battery. A spare power unit can connect with a power management unit and the battery. The power management unit stores excess charge to the spare power unit and to divert stored charge to the battery when the battery is charged less than a determined percentage.

According to another aspect, a system and a method monitor with a processor a voltage, a current and a temperature of a battery. The state of health of the battery is determined based on real time operation of the battery and a virtual operation of the battery. An operating limit of the battery is set based on the state of health of the battery.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

Existing battery systems are not adaptive with threshold parameters that are constant and not adaptable to changing environment and usage. As the battery ages, the cells deteriorate, which can produce uneven charges, diminished energy storage capacity and lower voltages. Also, existing battery systems are not model-based. In a stressful operating environment the predictive capability cannot be verified. Existing systems use inactive physical model parameters to manage a life of the battery. Therefore, a state-of-health of the battery cannot be synchronized with a virtual model.

An adaptive model based battery management system and method (collectively referred to as a system) monitors battery performance and health. The system can provide short-circuit detection and prevention with an active thermal control and fire prevention systems. The system can predict the true state-of-health of the battery in any type of environment, including stressful environments. An adaptive battery management system can include an active closed-loop system to ensure that the battery is used within its safe operating specifications in any environment. The adaptive control of the battery management system can be established by balancing every cell and monitoring each cell as not to exceed the maximum state of charge or discharge. In the charge mode, the excess charge can be stored in the spare cells. In the discharge mode, the store charge in the spare cells can be diverted to weak battery cells, e.g., battery cells that are charged less than a determined amount, e.g., a determined percentage of a full charge. The battery management system can be modular to enhance scalability from small to high voltage applications using baseline designs. The approach can lead to increased reliability due to multiple redundancies.

Predictive, adaptive, and control algorithms can be utilized for the safe operation of the battery. The system can provide a safe operating environment for batteries by using a model-based virtual cell as the guardian of the battery operations. The system can utilize two types of operations, real and virtual. The real-time operations are the operations of the battery at any type of environmental conditions. These operations are the real-time monitoring of temperature, voltage and current, etc. A temperature control unit establishes the limits of the operating temperatures and actively controls the charge and discharge rates of the battery. The virtual operations of the battery can be performed in parallel with the real time operations. The outputs can be correlated to analyze their data and deviations to predict the state-of-health of the battery. This provides the actual status of the state-of-health of the battery. This virtual operation of the battery is the standard of the model-based state-of-health. The output of the virtual model with the established operating threshold limits provide safe operating conditions and optimize the battery usage.

Figure 1:
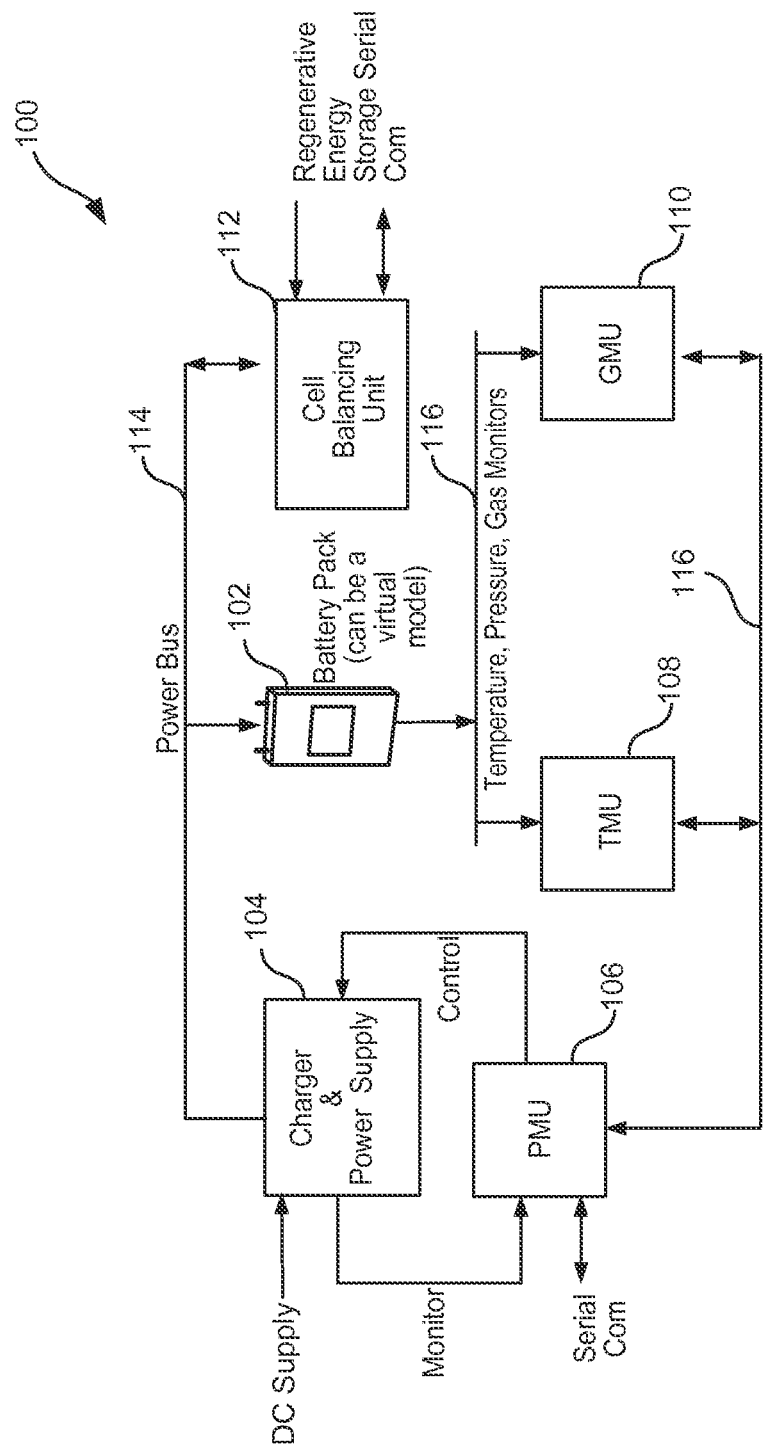
FIG. 1 is a block diagram of an example system for adaptively managing a battery.

FIG. 1 is a block diagram of an example system 100 for adaptively managing a battery 102, e.g., a battery management system (BMS). The system 100 can include one or more of a charger and power module 104, a power management system (PMU) 106, a temperature management unit (TMU) 108, a gas management unit (GMU) 110, and/or a cell balancing unit 112 to control and monitor the performance and health of the battery 102. The cell balancing unit 112 can connect with a regenerative energy storage and serial communication bus, as described in more detail below.

More or less components for managing the battery 102 can be used. A power bus 114 can connect the battery 102 with the charger and power module 104 and cell balancing unit 112. A communication bus 116 can connect the battery 102 with the PMU 106, TMU 108 and GMU 110.

The TMU 108 can include a passive temperature control unit that monitors the safe battery operating temperature. If the temperature reaches the set threshold for maximum operating temperature, the TMU 108, working in conjunction with the battery balancing unit 112, stops the charging or discharging of the battery 102. In conjunction with a predictive control algorithm, the rate of charge and discharge can be dynamically set to prevent the battery 102 from exceeding the maximum temperature. The TMU 108 may have an active capability depending on the sets of requirements. Heaters and some type of active heating or cooling can be implemented. When implemented, these capabilities are coupled with the rest of system 100 to prevent the battery 102 from exceeding the maximum and minimum temperature of the battery and as well in each cell within the battery 102.

The GMU 110 can activate when other protective measures within the battery 102 are exhausted, e.g., if thermal runaway is encountered, due to an internal short that is too quick to overheat the battery. Such reaction can trigger the GMU 110 which is used to activate abruptly the exhaust elements of the battery 102. The amount of oxygen generated and pressure buildup can be monitored and when the threshold limit is reached, indicating an uncontrollable thermal runaway, the exhaust valves are opened to relieve pressure and to divert the gas built-up through an opening leading to the outside of the vehicle. In some instance, an active system can be implemented to flood the inside of the battery 102 with nitrogen, thus extinguishing the thermal runaway reactions.

The charger and power module 104 controls the charging of the battery 102. The charger and power module 104 can derive its power from a system power supply and supply a set charge current to the battery 102. The PMU 106 can be scalable for high power application. The charge and power module 104 and PMU 106 can be stacked together to derive a high charging current. Control of the charger and power module 104 can be accomplished, in conjunction with the PMU 106, using multiple feedback parameters to monitor and control the charger and power module 104 to within its safe operating temperature, load current, and charge current. In one example, multiple PMUs 106 can be synchronized using an algorithm, e.g., that implements a master-slave type of relationship among the PMUs 106 to deliver each share of charge current, and to determine the right amount of charging current to the battery 102.

Figure 2:
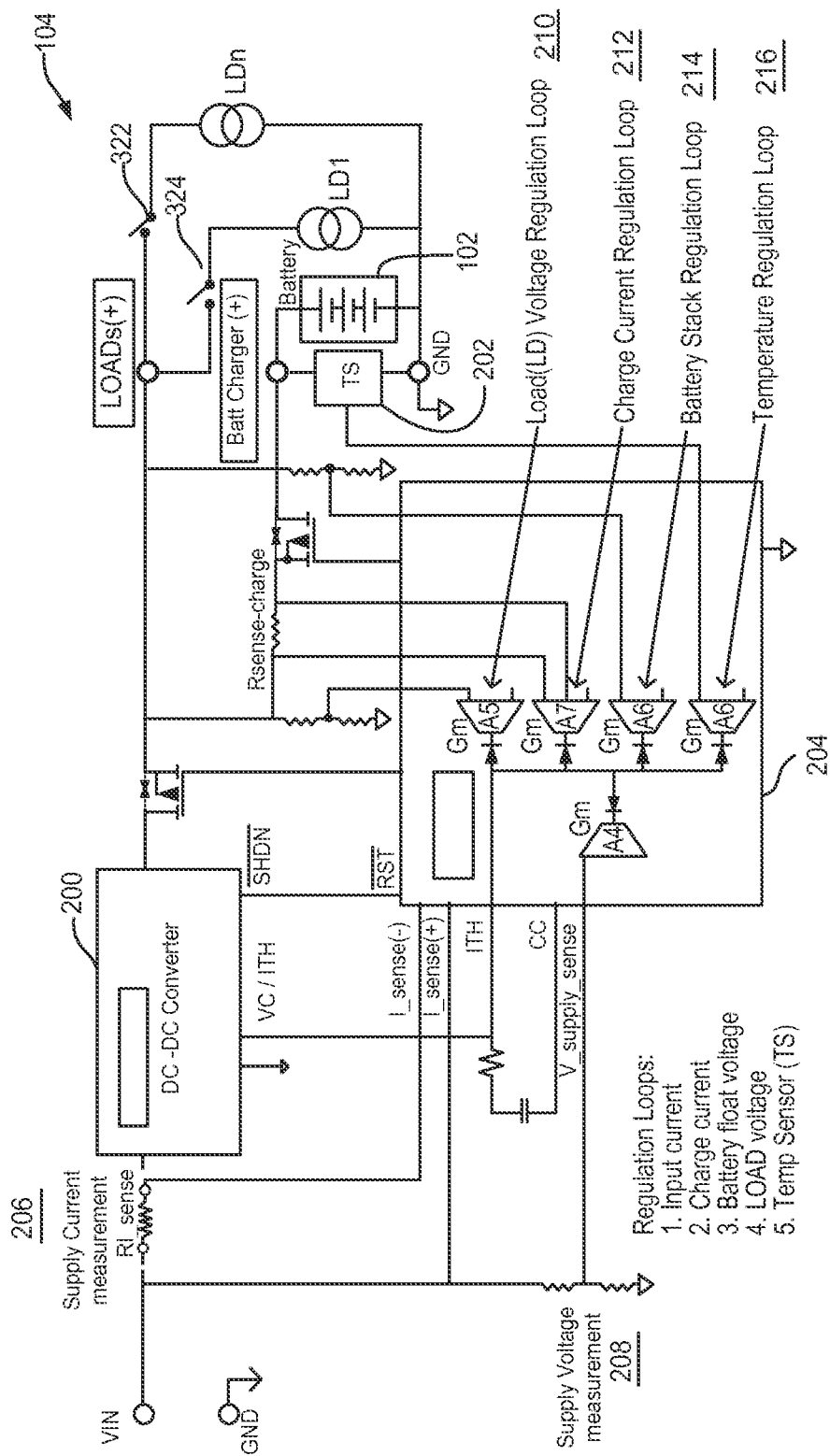
FIG. 2 is a circuit diagram of an example multi-loop battery charger and power module.

FIG. 2 is a circuit diagram of an example multi-loop battery charger and power module 104. The charger and power module 104 can be implemented as a subsystem of the PMU 106 to control the charging of the battery 102, which connects to loads LD1 through LDn, that can be all connected or prioritized using switches 322 and 324. The charger and power module 104 can include a DC to DC converter 200, a temperature sensor 202, and a control loop module 204, connected with various transistors, switches, capacitors and resistors as illustrated. The supply current 206 and the supply voltage 208 can be determined using RI_sense, I_sense(+), I_sense(−) and V_supply_sense, respectively.

The charger and power module 104 can provide a constant-current/constant-voltage charge characteristic to the battery 102 and employ a float voltage feedback reference, so any desired battery float voltage can be programmed. The control loop module 204 can include one or more of a load (LD) voltage regulation loop, a charge current regulation loop 212, a battery stack regulation loop 214 and a temperature regulation loop 216, as described further below. For example, the charge current regulation loop 212 can regulate the input voltage (VIN) by reducing charge current if the input voltage (VIN) falls below a programmed threshold level. Other features can include resistor programmable float voltage up, a wide input voltage range, scalable modules and scalable charge current, integrated input reverse voltage protection, selectable termination, and float voltage reference accuracy.

For multi-path control power generation, the charger and power module 104 can be implemented as a high voltage, high performance controller that converts many externally compensated power units into full-featured battery chargers. The charger and power module 104 fuses multi-control parameters; such as, load voltage, charge current, stack equalization monitor, temperature and supply current to set the appropriate and safe charge to the battery 102. Features can include: accurate current termination, temperature qualified charging using temperature sensor 202, automatic recharge, and C/10 trickle charge for deeply discharged cells, bad battery detection and status indicator outputs. The charger and power module 104 also includes precision current sensing that allows lower sense voltages for high current applications and provides low loss reverse current protection, over current and overvoltage protection. The charger and power module 104 can facilitate an instant-on feature that provides immediate downstream system power even when connected to a heavily discharged or short faulted battery. The charger and power module 104 can also precondition trickle charge, detect a bad battery, provide a choice of termination schemes and provide automatic restart.

Figure 3:
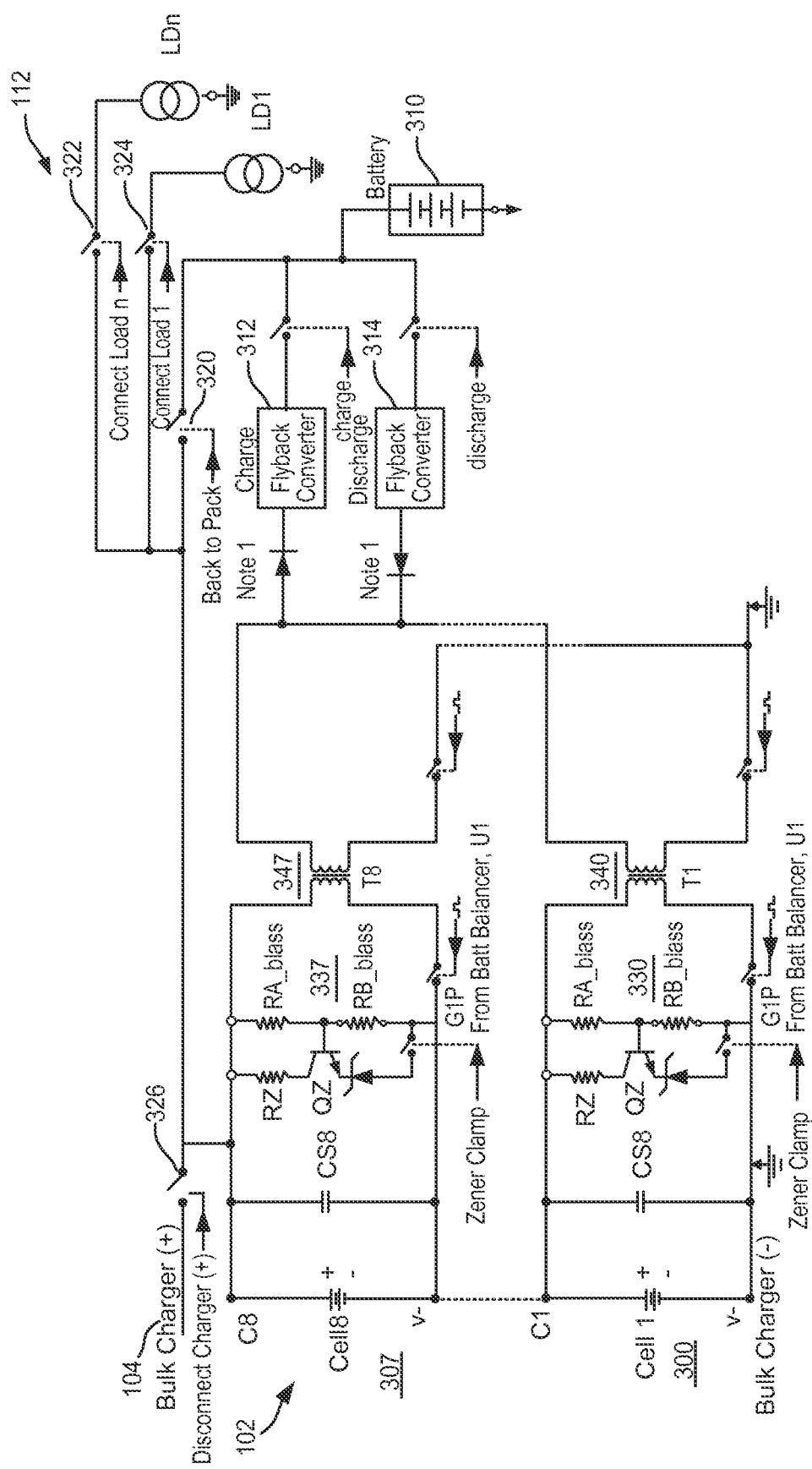
FIG. 3 is a circuit diagram of an example cell balancing unit.

FIG. 3 is a circuit diagram of an example cell balancing unit 112. The cell balancing unit 112 can be part of the battery 102 that balances the charge of individual cells, e.g., cell 1 (300) through cell 8 (307). Other numbers of cells can be used. The cells 300-307 can include various resistors, capacitors, switches, diodes and transformers, etc., as illustrated. Active balancing allows for capacity recovery in stacks of mismatched batteries. Charge from any selected cell 301-307 can be transferred at high efficiency to or from adjacent cells or to a spare cell or power unit 310. The spare cell or power unit 310 can include one or more batteries, cells, super capacitors, flywheels, etc. The spare cell or power unit 310 can connect with the cells 300-307 via a charge flyback converter 312 and discharge flyback converter 314. Flyback converters 312 can each include a monolithic flyback DC/DC converter designed to actively balance high voltage stacks of batteries, provides regulation, and voltage conversion between the cells 300-307 and spare cell or power unit 310. The high efficiency of a switching regulator can increase the achievable balancing current while reducing heat generation. In the charge mode, the excess charge can be stored in the spare cell or power unit 310. In the discharge mode, the stored charge in the spare cell or power unit 310 can be diverted to weak battery cells.

The spare cell or power unit 310 can operate as an external regenerative energy source for weak cells, to increase reliability. The cell balancing unit 112 can also include a switch 320 to connect/disconnect the spare cell or power unit 310 with the loads LD1 through LDn. Switches 322, 324 can connect/disconnect the cells 300-307 to the loads LD1 through LDn, respectively. A switch 326 can connect/disconnect the charger and power module 104 to the cells 300-307. Zerner diode-resistive protection circuits 330-337 can be used to bypass cells 300-307, respectively, during external shorts or to bypass dead cells, e.g., open circuits. The bypass zener diode can provides continuous charging/discharging of the battery 102 using the zener diodes to bypass bad cells 300-307. Isolation transformers 340-347 can provide isolation between the cells 300-307 and the cell balancing unit 112.

Figure 4:
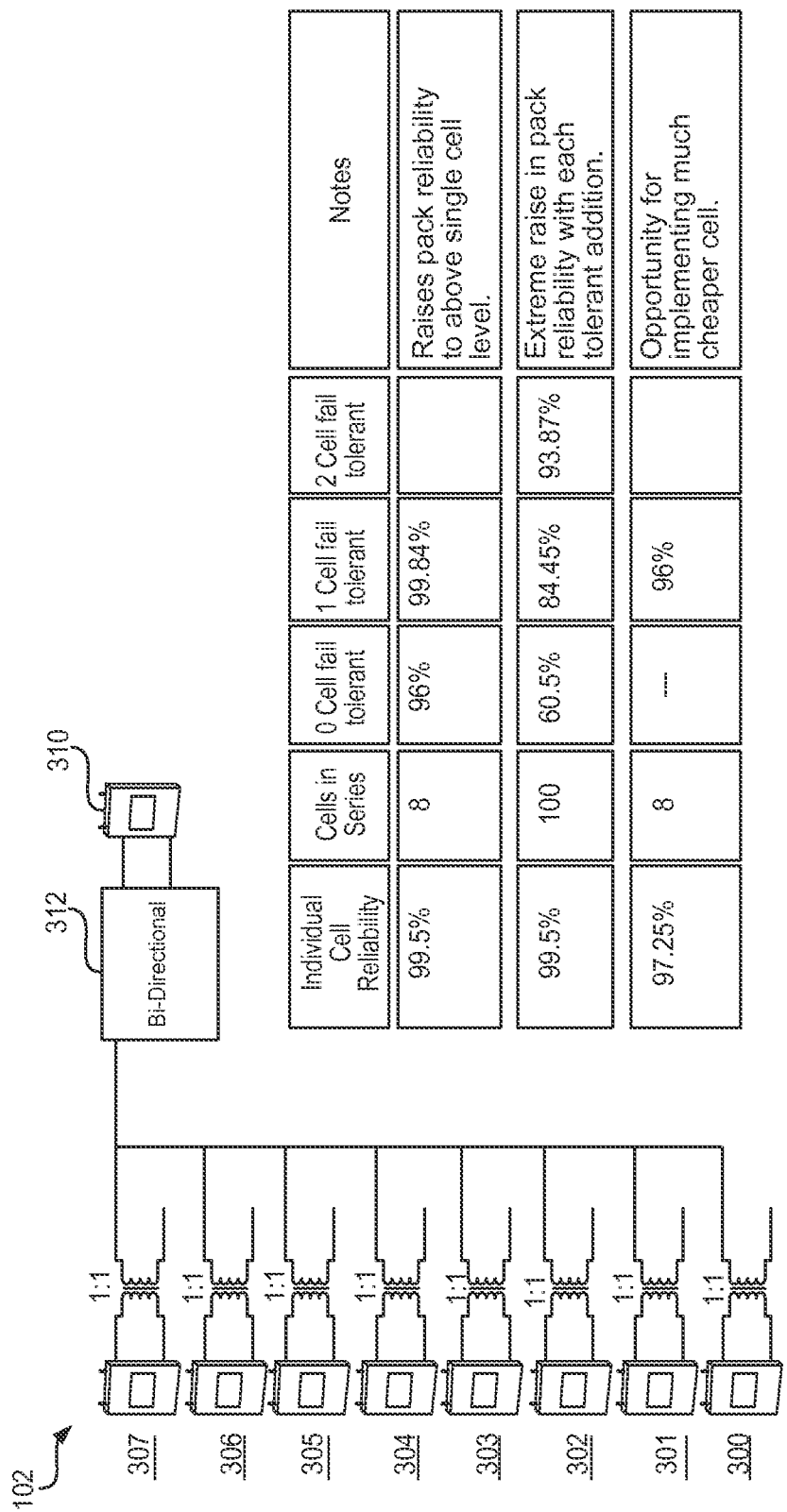
FIG. 4 is a block diagram of an example implementation for the cell balancing unit.

FIG. 4 is a block diagram of an example implementation for the cell balancing unit 112. The battery 102 can include multiple cells 300-307 connected in series. As a result, the charge current is the same for all of the cells 300-307. If one or more of the cells charge capacity is degraded, the cells 300-307 may be overcharged, overheated, or may lead to thermal runaway that can cause the battery 102 to explode and catch fire. During discharge, if the cells 300-307 are unbalanced, the weak cells reach the discharge threshold before the discharge cycle is over. As a result, the anode potential is reversed, leading to lithium plating. Over time, the platelets can puncture the separator, thus creating a short.

With the cell balancing unit 112, a fault-protected controller can be achieved for transformer-based bidirectional 312 active balancing of multi-cell battery stacks. Associated gate drive circuitry, precision current sensing, fault detection circuitry and a robust serial interface with built-in watchdog timer can be integrated, e.g., as described in FIG. 3. A level-shifting compatible serial interface enables multiple controllers to be connected in series, without optocouplers or isolators, allowing for balancing of every cell 300-307 in a long string of series-connected batteries 102.

The cell balancing unit 112 helps to ensure that each cell 300-307 operates at the right amount of charge during battery 102 charging and discharging. If a weak cell, e.g., one or more of cells 300-307, charges faster than the other cells, the overcharge current to the weak cell is diverted to a passive element, to other batteries and/or the spare cell or power unit 310. If, on the other hand, a weak cell discharges faster than the rest of them cells, then the discharged current can be derived from other batteries and/or the spare cell or power unit 310. This balancing continues until all the cells 300-307 reach a determined threshold for maximum charge and discharge levels. In this way, batteries 102 in a battery pack can achieve about 99.5 percent reliability, in one example. The illustrated percentages are for explanation purposes only.

Figure 5:
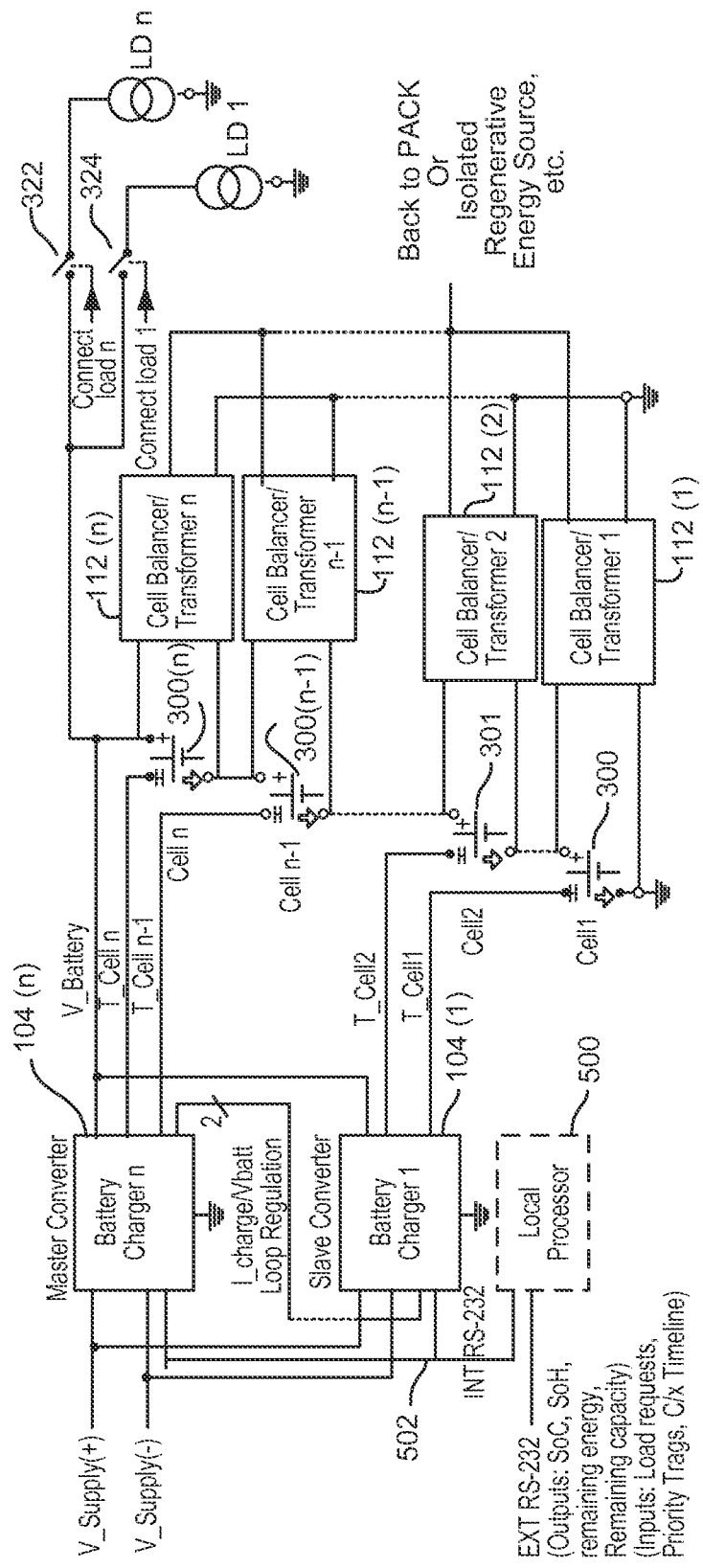
FIG. 5 is a block diagram of an example battery cell design that is scalable.

FIG. 5 is a block diagram of an example battery cell design that is scalable. Cells 300, 301, 300(n), 300(n−1), etc., are scalable as shown in FIG. 5 in a variety of cell formations, e.g., series, parallel, series-parallel connections, to form a module or a battery 102. The formation of the cells 300, 301, 300(n), 300(n−1) can use scalable series elements including cell balancing units 112(1), 112(2), 112(n−1), 112(n), battery charger and power module 104(1) through 104(n) and a local processor 500. Inputs to the processor 500 include load requests, priority tags and a charge/discharge timeline as described in more detail below. Outputs from the processor 500 include a standard operating condition (SOC), a state of health (SOH), remaining energy and remaining capacity, as described in more detail below.

Common cell balancing circuit enables N-number of cells to be put in series, e.g., only limited by the capability of the battery charger and power module 104(1) through 104(n−1). Common battery charger circuits enable scalable voltage and current levels. Serial peripheral interfaces (SPI) provide physical serial interface as well as serial data links 502 between smart scalable series interface units, e.g., for RS 232 or other communications. An SPI bus can operate with the local processor 500 serving as the master battery charger and power module 104(n) and with one or more slave battery charger and power module 104(1).

With multiple slave devices, an independent SS signal can be used from the master battery charger and power module 104(n) for each slave battery charger and power module 104(1). Slave devices can have tri-state outputs so their MISO signal becomes high impedance (logically disconnected) when the device is not selected. Devices without tri-state outputs cannot share SPI bus segments with other devices, e.g., only one slave can talk to the master, and only its chip select could be activated. To begin a communication, the bus master first configures the clock, using a frequency less than or equal to the maximum frequency the slave device supports. Such frequencies are typically up to a few MHz. The master then transmits the logic 0 for the desired chip over the chip select line. A logic 0 is transmitted because the chip select line is active low, meaning its off state is a logic 1; on is asserted with a logic 0. If a waiting period is used, e.g., for analog-to-digital conversion, then the master waits for at least that period of time before starting to issue clock cycles.

During each SPI clock cycle, a full duplex data transmission occurs. The master sends a bit on the MOSI line; the slave reads it from that same line. The slave sends a bit on the MISO line; the master reads it from that same line. Not all transmissions require all four of these operations to be meaningful. Transmissions normally involve two shift registers of some given word size, such as eight bits, one in the master and one in the slave; they are connected in a ring. Data is usually shifted out with the most significant bit first, while shifting a new least significant bit into the same register. After that register has been shifted out, the master and slave have exchanged register values. Then each device takes that value and performs an action, e.g., writing it to memory. If there is more data to exchange, the shift registers are loaded with new data and the process repeats.

Transmissions may involve a number of clock cycles. When there is no more data to be transmitted, the master can stop toggling its clock and then deselect the slave. Transmissions can include 8-bit words and the master can initiate multiple such transmissions as needed. However, other word sizes can also be used, such as 16-bit words for touch screen controllers or audio codec, like the TSC2101 from Texas Instruments; or 12-bit words for many digital-to-analog or analog-to-digital converters.

Figure 6:
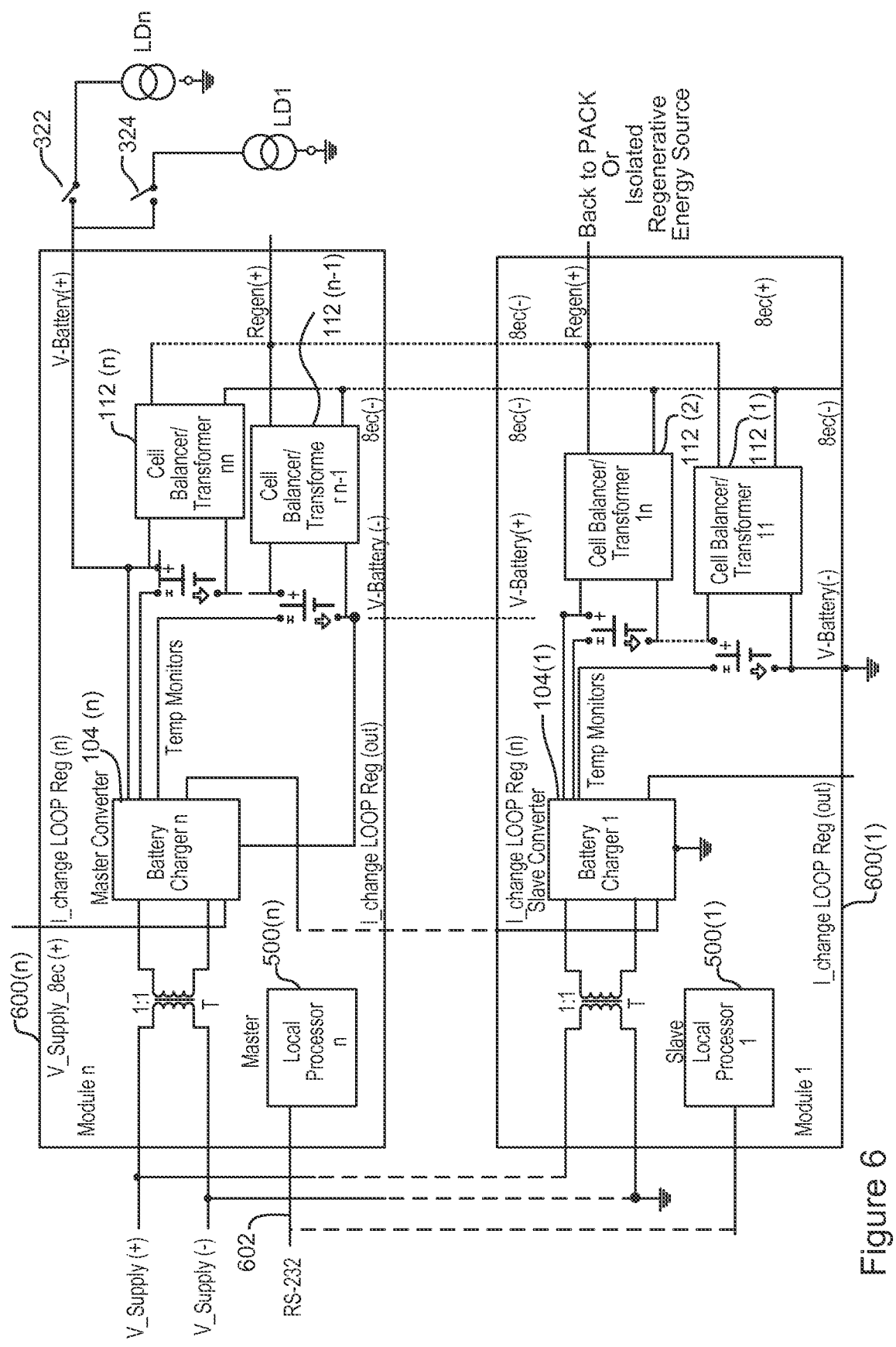
FIG. 6 is a block diagram of an example scalable modules implementation.

FIG. 6 is a block diagram of an example scalable modules 600(1) through 600(n) implementation. Modules 600(1) through 600(n) are scalable in a variety of module formations, e.g., series, parallel, series-parallel connections, to form high voltage batteries 102. Each module can have SPI interfaces; both physical interconnections and serial data link 602 communications, e.g., each module can be connected to share a common data link 602, e.g., for RS-232 communications. The common interface enables N-number of battery modules 600(1) through 600(n) to be put in series and/or parallel. Synchronization of battery charger and power modules 104(1)-104(n) enables n-number of battery modules 600(1) through 600(n).

Figure 7:
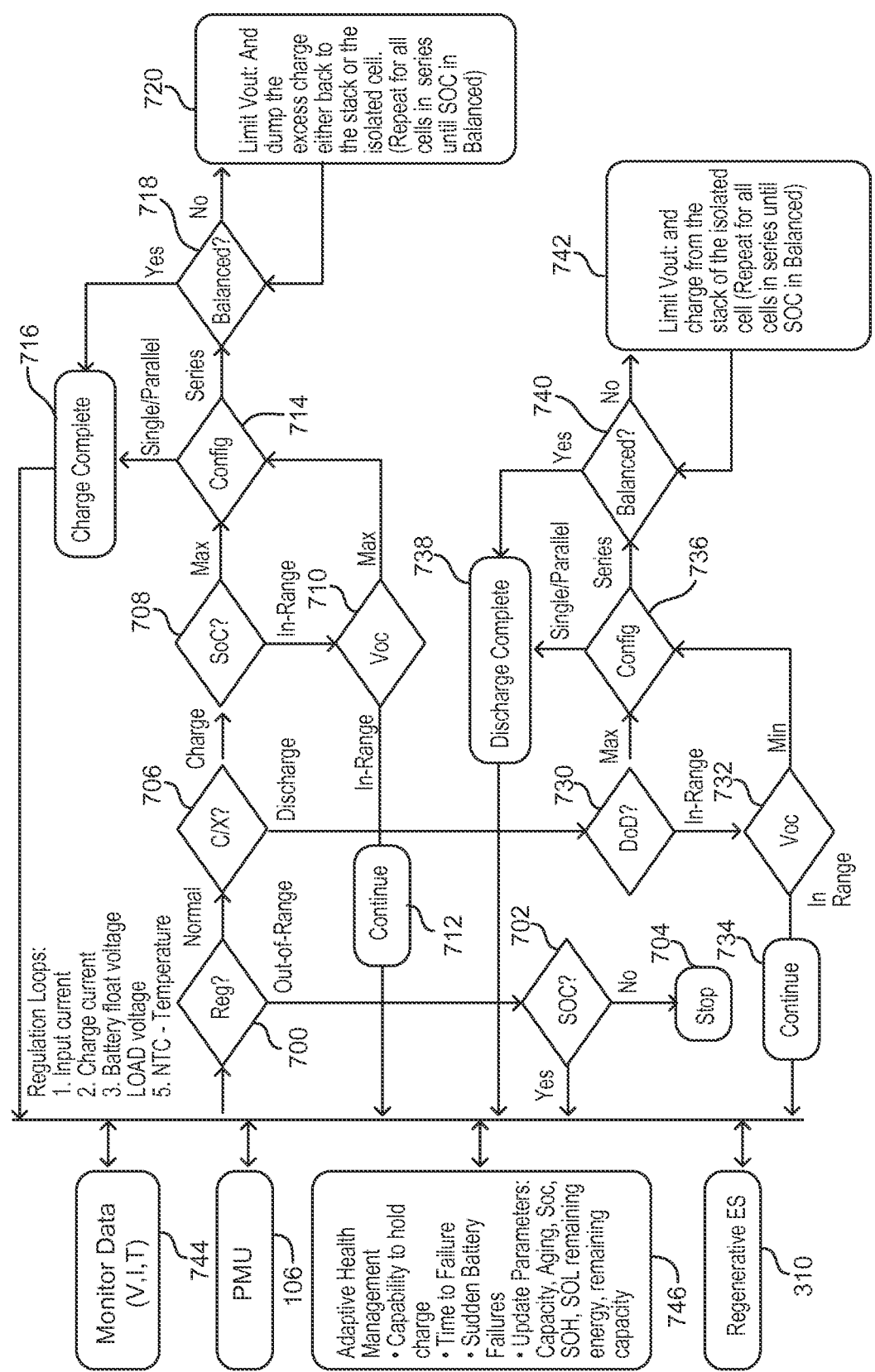
FIG. 7 is a flowchart of an example cell balancing algorithm.

FIG. 7 is a flowchart of an example cell balancing algorithm. The cell balancing algorithm can be one of several algorithms of the system 100 to correlate simulation data with real-time data for the battery 102. While system 100 is controlling and monitoring the state of the battery 102, the real-time information of the battery 102 can be independently monitored including various parameters of the battery 102, e.g., temperature, pressure, voltages, and current. From the parameters, the real-time part of the system can independently determine the standard operating condition, state of health, safety threshold parameters, and also charging/discharging of the battery 102.

The cell balancing algorithm establishes control of charge and discharging of each cell 300-307, etc. In conjunction with the rest of the subsystems, the cells 300-307 are charged at the rate and maximum standard operating condition (SOC) thresholds set by the adaptive algorithm subsystem. The cell balancing algorithm can check the battery regulation to determine if the cells 300-307 are operating normally or out-of-range (700). If the cells 300-307 are out of range, cell balancing algorithm determines if this is a standard operating condition (SOC) (720). If not a standard operating condition (SOC), power to the cells 300-307 is stopped (704). If the cells 300-307 are operating normally, the cell balancing algorithm determines if the cells are charging or discharging (706).

During charging of the cells 300-307, the cell balancing algorithm determines the state of charge (SOC) (708). If the state of charge (SOC) is in range, the voltage of the cells 300-307 is checked (710). If the voltage of the cells 300-307 is in range, the cell balancing algorithm continues to charge the cells 300-307 (712). If the voltage of one or more of the cells 300-307 is maxed out or the state of the charge (SOC) is maxed out, cell balancing algorithm completes the charge (716) or checks for cell balance (718) depending on a configuration of the cells, e.g., either a single cell/parallel cells or cells that are connected in series (714). If cells 300-307 configured in series are balanced (718), the cell balancing algorithm completes the charge (716).

If cells 300-307 configured in series are not balanced (718), then the cell balancing algorithm can limit voltage (Vout) and send the excess charge to the stack of cells 300-307 and/or to individual cells (720). This can be repeated for all cells in series until the cells are balanced, e.g., according the standard operating condition (SOC). When the standard operating condition (SOC) thresholds are reached, the cells 300-307 can pause the charging current to the cell can be diverted to the cell pack or an external resistor, or an external spare cell, or any type of energy storage element, e.g., spare cell or power unit 310. This process can also be performed when discharging, except that the external element or spare supply discharges the current.

In discharge mode, the discharging of the cells 300-307 is checked to in range or at the maximum level, e.g., according to the standard operating condition (SOC) (730). If in range, the cell balancing algorithm can check the voltage of the cells 300-307 for being in range or at a minimum (732). If in range, the cell balancing algorithm can allow the cells 300-307 to continue discharging. If the voltage of one or more of the cells 300-307 is minimized or the depth of discharge (DOD) is maxed out, cell balancing algorithm completes the discharge (738) or checks for cell balance (740) depending on a configuration of the cells, e.g., either a single cell/parallel cells or cells that are connected in series (736). If cells 300-307 configured in series are balanced (740), the cell balancing algorithm completes the discharge (738). Otherwise the cell balancing algorithm can limit voltage (Vout) and charge from the stack of cells and/or from individual cells. This can be repeated for all cells in series until the standard operating condition (SOC) is balanced.

Concurrent with the real-time monitoring of voltage, current and temperature (744), an offline processing of the multi-physics-derived models can be operated (746). These models adapt to the existing operating environments of the real-time processing and store the control and operating parameters. The voltages, current, temperatures, and pressures can be stored in a dynamic virtual-memory, while at the determining standard operating condition (SOC) and other state-of-health parameters and thresholds. The local processor 500, e.g., of FIGS. 5 and 6, can control the processing of the data. The real-time data and the simulated data are correlated together to establish statistically accurate predictions and future data trends, e.g., capability to hold charge, a determined time of failure, predict sudden battery failures, update parameters including capacity, aging, standard operating condition (SOC), state of health (SOH), state of life (SOL), remaining energy and remaining capacity. The resulting control parameters can be used to update the control and threshold parameters of the real-time system to ensure safe and reliable battery operations.

Figure 8:
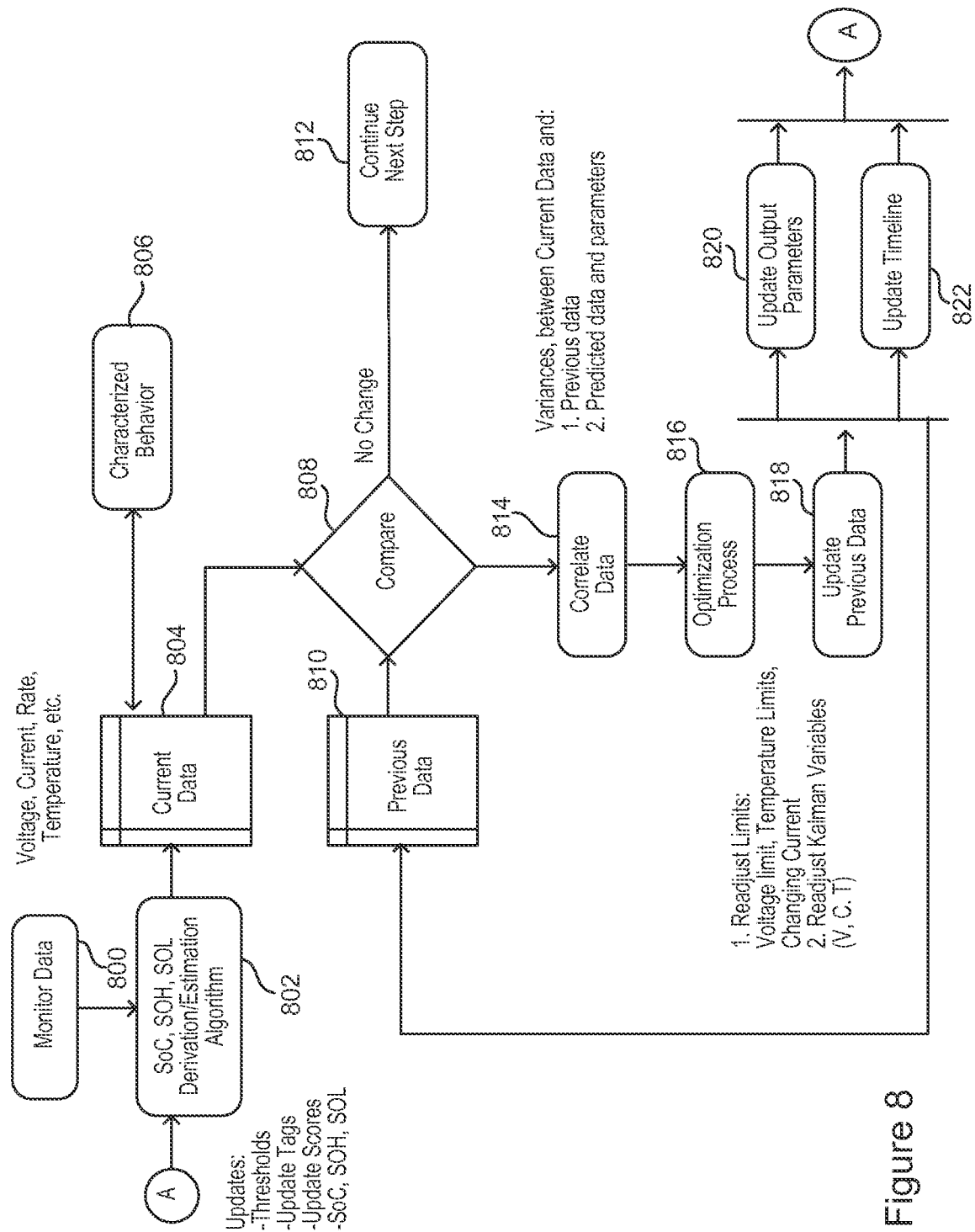
FIG. 8 is a flowchart of an example model-based adaptive algorithm.

FIG. 8 is a flowchart of an example model-based adaptive algorithm. Adaptive control power management can include forward-looking algorithms for impending battery failures, and countermeasures to impede and to prevent catastrophic failures. The model-based algorithm can work in conjunction with other subsystems to establish the data processing of both the real-time and simulated data. The process can update the operating and threshold parameters of the real-time system 100 and also characterize the state-of-health (dead cells, weak cells, etc.), standard operating condition (SOC), heat generation, temperature change, maximum rate of charge/discharge. The adaptive algorithm can also predict the remaining state of life (SOL) of the battery.

The adaptive algorithm can utilize monitored data, e.g., voltage, current, rate and temperature (800). The data can be input into a SOC, SOH, and SOL derivation/estimation algorithm, along with updates from (A) described below (802). The derivation/estimation algorithm outputs current data, and the current data (804) can include characterized behavior, e.g., SOH (information about dead cells, weak cells, charging current), capacity, maximum discharge, maximum rate of charge, heat generation, temperature change, etc. (806). The adaptive algorithm can compare (808) current data (804), including the characterized behavior, with the previous data (810). If there is no change, the adaptive algorithm continues without needing to correlate data, etc. If there is a change between the current data (804) and the previous data (810), the adaptive algorithm can correlate the data, e.g., to determine variances between the current data and previous data and predicted data and parameters (814). In this way the adaptive algorithm can be implemented as an empirical model, e.g., based on, concerned with, or verifiable by observation or experience rather than theory or pure logic.

The adaptive algorithm can also perform an optimization to process to readjust voltage, temperature and changing current limits, and readjust Kalman filter variables (e.g., voltage, current and temperature) (816). The adaptive algorithm updates the previous data for future reference (818). The adaptive algorithm updates the output parameters (820) and updates the timeline (822), e.g., predicted life of the battery 102, for inputting to the derivation/estimation algorithm (802), e.g., to determine the current data (804).

Figure 9:
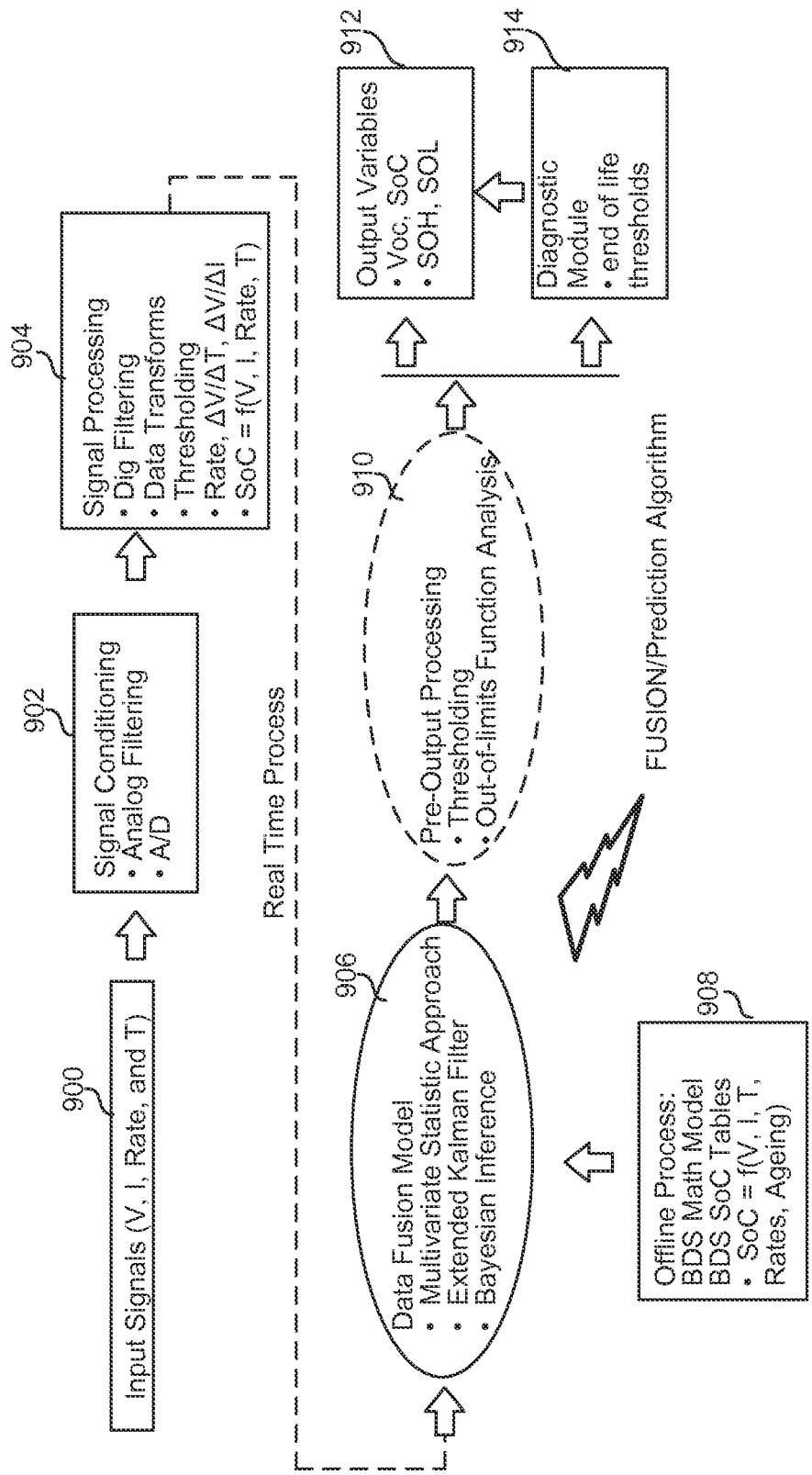
FIG. 9 is a block diagram of an example integrated battery health management system (IBHM) algorithm.

FIG. 9 is a block diagram of an example integrated battery health management system (IBHM) algorithm. The IBHM can be integrated into the PMU 106 of FIG. 1, or be implemented as a separate unit. The IBHM algorithm, in conjunction with the model-based algorithm and systems described above, can establish the present and forecast behavior of the battery 102. The IBHM can store the updated state-of-health of the battery 102, predict the remaining life, and updates the operating/control parameters of the battery 102. The state-of-health can include a capability of the battery 102, e.g., whether the battery 102 is new, half way through life, at the end of life, etc. In one example, the PMU 106 can operate the battery 102 based on the state of health of the battery 102. For example, the battery operating thresholds can be adjusted based on the state of the health. The IBHM can also store/recommend a proper maintenance or replacement of the battery 102.

The IBHM algorithm can receive input signal, e.g., voltage, current, rate and temperature (900). The IBHM can condition the input signals, e.g., with analog filtering and/or analog-to-digital (A/D) conversion (902). The IBHM can process the signals, e.g., through dig filtering, data transforms, thresholding, rate (change in voltage over change in temperature and/or change in voltage over change in current), and/or determining state of charge (SoC), e.g., as a function of voltage, current, rate and temperature (904). The conditioned and processed inputs can be fed to a data fusion model, e.g., multivariate statistic approach, an extended Kalman filter, and/or a Bayesian inference (906). As part of the data fusion model, offline process information can be inputted, including a BDS math model, a BDS standard of condition (SOC) tables, and SoC as a function of voltage, current, temperature, rates and ageing (908). Derived SoC can be determined from filtered voltage, current and temperature measurements. The extended Kalman filter can provide a good estimate of the actual measurements and account for incomplete and noisy data. The Bayesian inference can fuse prior knowledge of SoC, current, voltage (Voc), rate and temperature to get a better estimate of SOC limits, time plus one (t+1), (t+2), . . . (t+n) thresholds and temperature.

Pre-output processing can include thresholding and out-of limits function analysis (910). The IBHM can then determine output variable Voc, SoC, SOC, SOH and SOL (912). The IBHM can also include a diagnostic module to determine end of life thresholds from the signals (914). The end of life thresholds can be part of the output variables.

Advantages of the system 100 can include higher safety and reliability, a system 100 that provides higher reliability and safe operations within the manufacturer's specifications, health monitoring and prognosis capabilities, inclusion of various safety mechanisms and countermeasures within the cell/module, and/or greater battery utilization. The system 100 can operate the battery 102 in a wider range of state of charge (SoC), e.g., that is specific to its chemical properties and customer requirements.

The systems and methods described above may be implemented in many different ways in many different combinations of hardware, software firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:
1. A system, comprising:
a battery;
a power management unit connected with the battery and operable to control power to and from the battery based on an adaptive cell balancing algorithm specific to the battery, wherein the adaptive cell balancing algorithm:
receives an input from the battery during at least one of a charge event and a discharge event, wherein the input comprises one or more of voltage information, current information, temperature information, and pressure information for the battery;
determines current data for the battery using the input, wherein the current data comprises data for a parameter of the battery that is selected from a state of health, a capacity, a maximum discharge, a maximum rate of charge, a heat generation, and a temperature change;
compares the current data with previous data for the parameter of the battery that is determined during at least one of a previous charge event and a previous discharge event;
updates a virtual model of the battery when the comparison indicates that the current data is changed from the previous data, wherein updating the virtual model comprises:
determining one or more first statistical variances between the current data and the previous data, and
determining one or more second statistical variances between the current data and predicted data;

generates at least one limit based on the updated virtual model, wherein the at least one limit includes at least one of a voltage limit, a current limit, a temperature limit, and a pressure limit; and outputs the at least one limit to the power management unit, wherein the power management unit limits power to and from the battery to prevent exceedance of the at least one limit; and a spare power unit connected with the power management unit and the battery, the power management unit operable to store excess charge to the spare power unit and to divert stored charge from the spare power unit to the battery when the battery is charged less than a determined percentage.

2. The system of claim 1, where the power management unit operates the battery within determined threshold limits.

3. The system of claim 2, where the threshold limits comprise at least one of power and current for a determined load.

4. The system of claim 1, where the power management unit determines a health of the battery.

5. The system of claim 4, where the health of the battery comprises a new battery, a battery halfway through life, and a battery at an end of life.

6. The system of claim 4, where the power management unit adjusts thresholds limits based on the health of the battery.

7. The system of claim 1, where the power management unit predicts a state of the battery by comparing real-time data with simulated data.

8. The system of claim 1, further comprising an isolation transformer connected between the battery and spare power unit.

9. The system of claim 1, further comprising a zener diode connected with a cell of the battery, wherein the zener diode is operable to bypass a bad cell.

10. The system of claim 9, where the bad cell comprises an open-circuit to the battery during charging or discharging.

11. The system of claim 1, where the power management unit predicts a life of the battery, based on a rate of change of a state of charge for the battery output by the adaptive cell balancing algorithm.

12. The system of claim 1, where the power management unit recommends a maintenance for the battery, based on a rate of change of a state of charge for the battery output by the adaptive cell balancing algorithm.

13. The system of claim 1, further comprising a temperature management unit connected with the power management unit, the temperature management unit monitors a temperature of the battery and to stop charging or discharging the battery when the battery is operating outside of a determined limit.

14. The system of claim 1, further comprising a gas management unit connected with the power management unit, the gas management unit monitors a pressure of gas around the battery and to open a valve to relieve pressure and divert gas when the gas or pressure are outside of a determined limit.

15. The system of claim 1, further comprising a cell balancing unit connected with the battery and the spare power unit, wherein the cell balancing unit is operable to balance a charge of cells of the battery.

16. The system of claim 1, wherein the power management unit is further operable to update the adaptive cell balancing algorithm by:

receiving monitoring data comprising at least one of a temperature, current, and voltage for the battery;

calculating current state of health parameters from a first iteration of the adaptive cell balancing algorithm, based on the received monitoring data;

comparing the current state of health parameters to previously-calculated state of health parameters; and upon the current state of health parameters differing from the previously calculated state of health parameters, correlating the current state of health parameters and the previously-calculated state of health parameters to determine at least one statistical variance and updating the adaptive cell balancing algorithm based on the determined at least one statistical variance.

17. The system of claim 16, wherein the power management unit further updates at least one of the voltage limit, the current limit, and the temperature limit based on the updated adaptive cell balancing algorithm.

18. A method, comprising:

monitoring with a processor a voltage, a current, a temperature, and a pressure of a battery;

determining a state of health of the battery based on real time operation of the battery and a virtual operation of the battery, wherein the virtual operation of the battery is based on an adaptive cell balancing algorithm implemented by a power management unit and specific to the battery, wherein the adaptive cell balancing algorithm:

receives an input from the battery during at least one of a charge event and a discharge event, wherein the input comprises one or more of voltage information, current information, temperature information, and pressure information for the battery;

determines current data for the battery using the input, wherein the current data comprises data for a parameter of the battery that is selected from a state of health, a capacity, a maximum discharge, a maximum rate of charge, a heat generation, and a temperature change;

compares the current data with previous data for the parameter of the battery that is determined during at least one of a previous charge event and a previous discharge event;

updates a virtual model of the battery when the comparison indicates that the current data is changed from the previous data, wherein updating the virtual model comprises:

determining one or more first statistical variances between the current data and the previous data, and determining one or more second statistical variances between the current data and predicted data;

generates at least one limit based on the updated virtual model, wherein the at least one limit includes at least one of a voltage limit, a current limit, a temperature limit, and a pressure limit; and outputs the at least one limit, wherein the power management unit limits power to and from the battery to prevent exceedance of the output at least one limit; and setting an operating limit of the battery based on the state of health of the battery.

19. The method of claim 18, further comprising sending excess charge to a spare power unit and diverting stored charge from the spare power unit to the battery that is charged less than a determined percentage.

20. The method of claim 18, further comprising predicting a life of the battery.

21. The method of claim 18, further comprising recommending a maintenance of the battery.

22. The method of claim 18, further comprising balancing a charge of cells of the battery.

\* \* \* \* \*